(12) United States Patent
Al-Shahri et al.

(10) Patent No.: US 11,708,754 B2
(45) Date of Patent: Jul. 25, 2023

(54) SYSTEMS AND METHODS FOR GENERATING A DRAINAGE RADIUS LOG

(71) Applicant: Saudi Arabian Oil Company, Dhahran (SA)

(72) Inventors: Ali M. Al-Shahri, Doha (SA); Waqas Ahmed Khan, Khobar (SA); Nauman Aqeel, Dhahran (SA); Khaled Benzaoui, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 185 days.

(21) Appl. No.: 17/069,306

(22) Filed: Oct. 13, 2020

(65) Prior Publication Data
US 2021/0348492 A1 Nov. 11, 2021

Related U.S. Application Data

(60) Provisional application No. 63/022,859, filed on May 11, 2020.

(51) Int. Cl.
*E21B 43/30* (2006.01)
*E21B 47/003* (2012.01)
(Continued)

(52) U.S. Cl.
CPC ............ *E21B 43/30* (2013.01); *E21B 43/25* (2013.01); *E21B 47/003* (2020.05);
(Continued)

(58) Field of Classification Search
CPC ........ E21B 43/30; E21B 43/25; E21B 47/006; E21B 49/0875; E21B 41/00; E21B 43/00;
(Continued)

(56) References Cited

U.S. PATENT DOCUMENTS 6,549,879 B1 4/2003 Cullick et al.
7,062,420 B2 6/2006 Poe, Jr.
(Continued)

FOREIGN PATENT DOCUMENTS

CN 107133880 A * 9/2017 ............ G06F 17/10
WO 2008002345 A2 1/2008

OTHER PUBLICATIONS

International Search Report and Written Opinion dated Apr. 26, 2021 pertaining to International application No. PCT/US2020/067436 filed Dec. 30, 2020, 16 pgs.
(Continued)

*Primary Examiner* — Daniel R Miller
*Assistant Examiner* — Christian T Bryant
(74) *Attorney, Agent, or Firm* — Dinsmore & Shohl LLP

(57) ABSTRACT

Embodiments described herein include a system for generating a drainage radius log per well that includes a computing device that receives well data associated with a plurality of wells, utilizes the well production data to calculate a value for cumulative liquid produced by each of the plurality of wells for a predetermined time period, and utilizes at least a portion of the well data to calculate a fractional contribution for each of the plurality of wells. In some embodiments the computing device utilizes the value for cumulative liquid produced for each of the plurality of wells and the fractional contribution to calculate a cumulative liquid production for each of the plurality of wells, utilizes the cumulative liquid production to calculate the drainage radius log for each of the plurality of wells, and outputs the drainage radius log for display.

20 Claims, 10 Drawing Sheets

(51) Int. Cl.
*G06T 17/00* (2006.01)
*E21B 43/25* (2006.01)
*E21B 41/00* (2006.01)
*E21B 43/14* (2006.01)
*E21B 47/08* (2012.01)
*E21B 47/10* (2012.01)
*E21B 43/00* (2006.01)
*E21B 49/08* (2006.01)
*G01V 99/00* (2009.01)
*E21B 49/00* (2006.01)

(52) U.S. Cl.
CPC .......... *E21B 49/0875* (2020.05); *G06T 17/00* (2013.01); *E21B 41/00* (2013.01); *E21B 43/00* (2013.01); *E21B 43/14* (2013.01); *E21B 47/08* (2013.01); *E21B 47/10* (2013.01); *E21B 49/008* (2013.01); *E21B 2200/20* (2020.05); *G01V 99/005* (2013.01)

(58) Field of Classification Search
CPC .... E21B 2200/20; E21B 47/10; E21B 49/008; E21B 43/14; E21B 47/00; E21B 47/08; E21B 47/003; G06T 17/00; G01V 99/005

See application file for complete search history.

(56) References Cited

U.S. PATENT DOCUMENTS

| | | | |
|---|---|---|---|
| 7,369,979 B1* | 5/2008 | Spivey | E21B 43/14 703/2 |
| 10,180,057 B2* | 1/2019 | Rahman | E21B 49/008 |
| 2002/0043370 A1 | 4/2002 | Poe | |
| 2003/0225522 A1* | 12/2003 | Poe | E21B 43/00 702/11 |
| 2007/0213963 A1* | 9/2007 | Jalali | G01F 1/74 703/10 |
| 2010/0125349 A1* | 5/2010 | Abasov | E21B 43/30 705/1.1 |
| 2011/0011595 A1* | 1/2011 | Huang | E21B 43/00 703/10 |
| 2011/0155369 A1 | 6/2011 | Badazhkov et al. | |
| 2016/0010444 A1* | 1/2016 | AlQahtani | E21B 41/0092 703/10 |
| 2018/0320512 A1* | 11/2018 | Anisur Rahman | E21B 41/0092 |
| 2019/0325331 A1 | 10/2019 | Benhallam et al. | |

OTHER PUBLICATIONS

Spivey, J.P. "Estimating layer properties for wells in multilayer low-permeability gas reservoirs by automatic history-matching production and production log data", Society of Petroleum Engineers Journal, Dallas, TX, US, No. 100509, May 15, 2006, pp. 1-14.

* cited by examiner

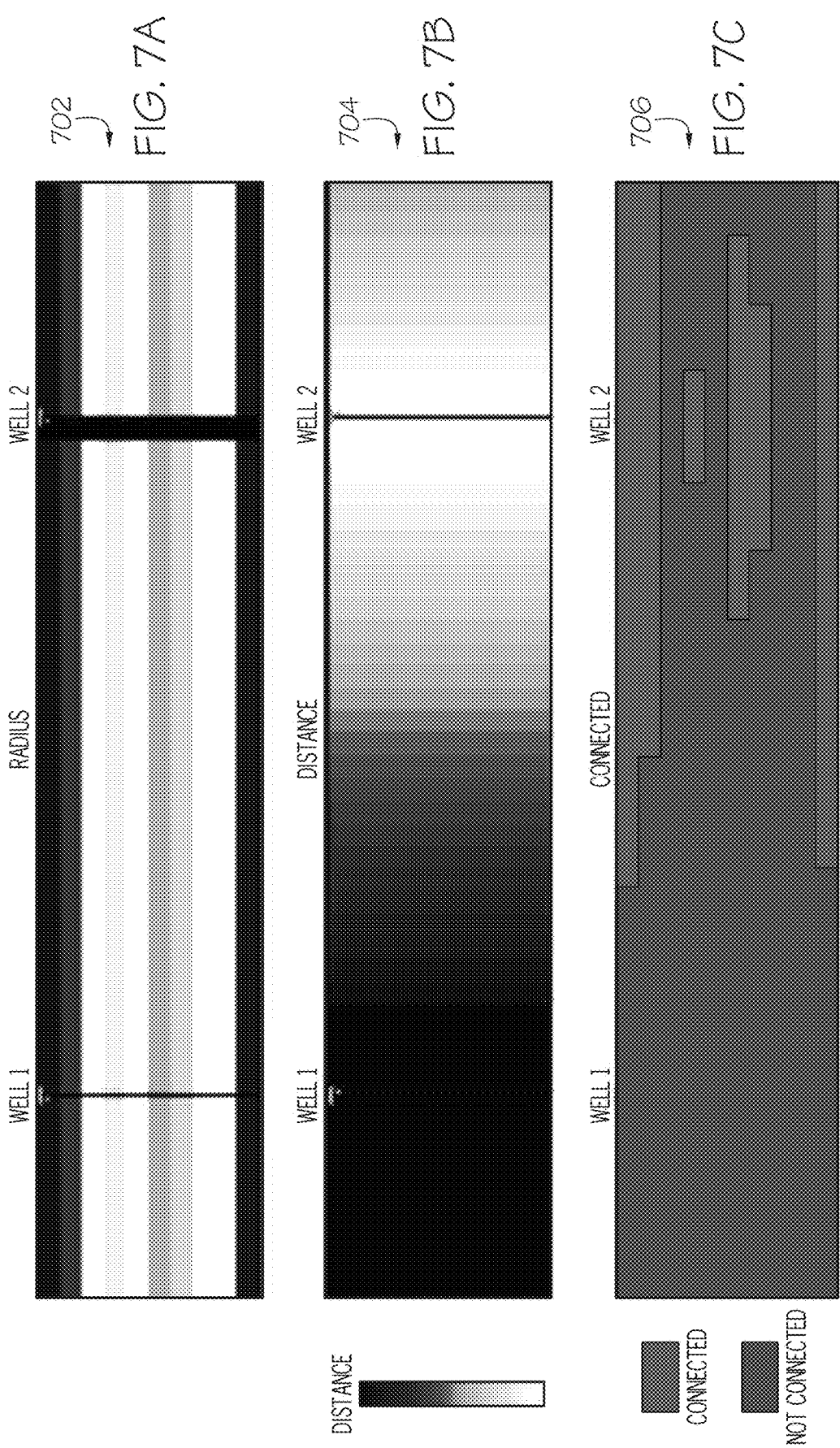

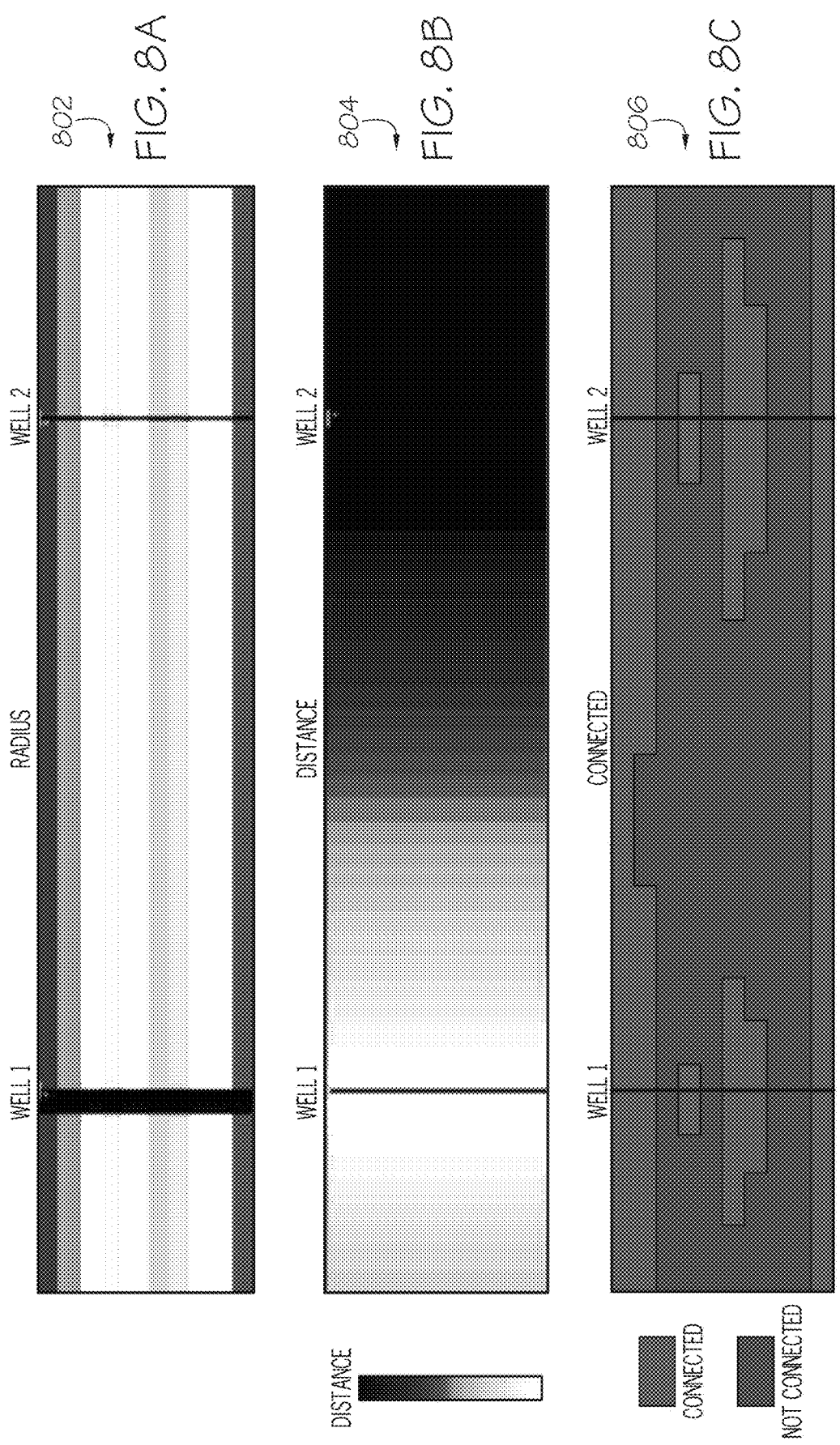

SYSTEMS AND METHODS FOR GENERATING A DRAINAGE RADIUS LOG

CROSS REFERENCE

This application claims the benefit of U.S. Provisional Application Ser. No. 63/022,859, filed May 11, 2020.

TECHNICAL FIELD

Embodiments described herein are directed to generating a drainage radius log and, more specifically, to calculating drainage radius logs per well at any point in time.

BACKGROUND

One of the biggest challenges the oil and gas industry faces today is generating a drainage radius log. Drainage radius refers to the radius of a cross-section around a single wellbore from which the hydrocarbon flows into the wellbore. The drainage radius of a reservoir can be utilized to determine the number of wells needed and desired location to efficiently drain the reservoir. Conventionally, drainage radius is calculated as a single value per well, which can be time consuming and create inaccuracies. Thus, a need exists in the industry for systems and methods for generating a drain radius log.

SUMMARY

Embodiments described herein include a system for generating a drainage radius log per well that includes a computing device that receives well data associated with a plurality of wells, utilizes the well production data to calculate a value for cumulative liquid produced by each of the plurality of wells for a predetermined time period, and utilizes at least a portion of the well data to calculate a fractional contribution for each of the plurality of wells. In some embodiments the computing device utilizes the value for cumulative liquid produced for each of the plurality of wells and the fractional contribution to calculate a cumulative liquid production for each of the plurality of wells, utilizes the cumulative liquid production to calculate the drainage radius log for each of the plurality of wells, and outputs the drainage radius log for display.

Some embodiments of a method include receiving, by a computing device, well data associated with a plurality of wells, the well data including well production data, utilizing, by the computing device, the well production data to calculate a value for cumulative liquid produced by each of the plurality of wells for a predetermined time period, and utilizing, by the computing device, at least a portion of the well data to calculate a fractional contribution for each of the plurality of wells. In some embodiments, the method includes utilizing, by the computing device, the value for cumulative liquid produced for each of the plurality of wells and the fractional contribution to calculate a cumulative liquid production for each of the plurality of wells for each of a plurality of predetermined depth segments, utilizing, by the computing device, the cumulative liquid production to calculate a drainage radius log for each of the plurality of wells over time at each of the plurality of predetermined depth segments, and outputting, by the computing device, the drainage radius log for display.

Some embodiments of a non-transitory computer-readable medium include logic that, when executed by a computing device, causes the computing device to receive well data associated with a plurality of wells, utilize the well data to calculate a value for cumulative liquid produced by each of the plurality of wells for a predetermined time period, and utilize at least a portion of the well data to calculate a fractional contribution for each of the plurality of wells. In some embodiments, the logic causes the computing device to utilize the value for cumulative liquid produced for each of the plurality of wells and the fractional contribution to calculate a cumulative liquid production for each of the plurality of wells for each of a plurality of predetermined depth segments, utilize the cumulative liquid production to calculate a drainage radius log for each of the plurality of wells over time at each of the plurality of predetermined depth segments, and output the drainage radius log for display.

BRIEF DESCRIPTION OF THE DRAWINGS

FIGS. 7A-7C depict user interfaces providing drained intervals at a first well, according to embodiments provided herein;

FIGS. 8A-8C depict user interfaces providing drained intervals, according to embodiments provided herein;

DETAILED DESCRIPTION OF THE DISCLOSURE

This disclosure provides systems and methods for generating a drainage radius log per well in time. Embodiments described herein provide a new workflow to calculate the drainage radius log per well at any point in time and then use these logs as an input to populate properties such as porosity and permeability in a three dimensional representation or three dimensional model. Embodiments herein create a log of drainage radius per well at any point in time, which is then used as an input (e.g., as a range value in a variogram) for populating 3D properties. The same result could be useful for future drilling planning and un-swept intervals identification.

These embodiments involve using well logs to calculate porosity-thickness (PHIH) and permeability-thickness (KH) across flowing intervals in time (accounting for changes in well completion and production zones). Additionally, the process may involve back allocating production data to well logs based on PHIH and KH values, calculating the drainage radius log using back allocated production and the drainage radius equation, and using the calculated drainage radius log to define a range of variogram in the modeling software and populate properties in three dimensions.

Additionally, these embodiments utilize the results of these logs to populate the three dimensional (3D) properties in the reservoir model. The drainage radius values may be used as variogram inputs for distance (range) when populating the 3D properties. As a result, these embodiments solve the problem of arbitrarily assigning the variogram range values.

The technical solution of these embodiments includes using well logs to calculate porosity-thickness (PHIH) and permeability-thickness (KH) across flowing intervals in time (accounting for any changes in well completion and production zones), back allocating production data from same time to well logs based on PHIH and KH values, and calculating the drainage radius log using back allocated production and the drainage radius equation. In some embodiments, the technical solution involves using the calculated drainage radius log to define range of variogram in the modeling software and populate properties in three dimensions.

Further, embodiments described herein utilize the drainage radius per well and depth as an input parameter for variogram range. Drainage radius may be useful for a geostatistics model phase. By using this process, embodiments described herein may utilize dynamic data to help enhance the static model, specifically a facies model. The same result could be useful for future drilling planning and un-swept intervals identification.

Figure 1:
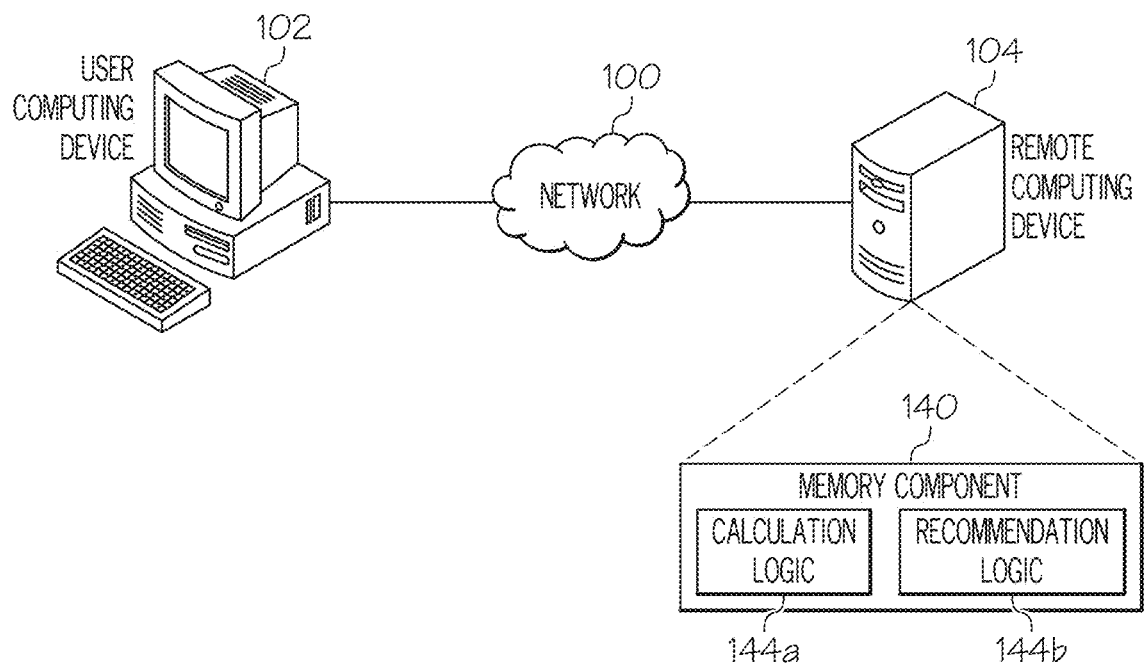
FIG. 1 depicts a computing environment for generating drainage radius logs, according to embodiments provided herein.

Referring now to the drawings, FIG. 1 depicts a computing environment for generating drainage radius logs, according to embodiments provided herein. As illustrated, the embodiment of FIG. 1 illustrates a network coupled to a user computing device 102 and a remote computing device 104. The network 100 may include any wide area network (such as the internet, cellular network, mobile data network, WiMax network, etc.), any local network (such as a local area network, Wi-Fi network, mesh network, etc.), and/or any peer-to-peer network (such as via Bluetooth, ZigBee, etc.). The user computing device 102 may be configured as any personal computer, laptop, mobile device, database, server, etc. for interfacing with a user and thus may include input devices and output devices for facilitating such interface. The remote computing device 104 may include any server, database, personal computer, tablet, mobile device, and/or other device for storing data described and/or performing the calculations described herein. As depicted in FIG. 1, the remote computing device 104 may include a memory component 140 that stores calculation logic 144a and recommendation logic 144b. As described in more detail below, the calculation logic 144a may be configured for causing a computing device to accumulate data, perform the calculations, assemble graphical depictions of wells, etc. The recommendation logic 144b may cause the computing device to recommend a specific action, provide coordinates for that action, etc.

It will be understood that while FIG. 1 depicts a particular network configuration, this is merely one example. Some embodiments may be configured such that the user computing device 102 performs the calculations and recommendations (and thus stores the calculation logic 144a and/or the recommendation logic 144b) and only retrieves data from the remote computing device 104. Other embodiments are also contemplated.

Figure 2:
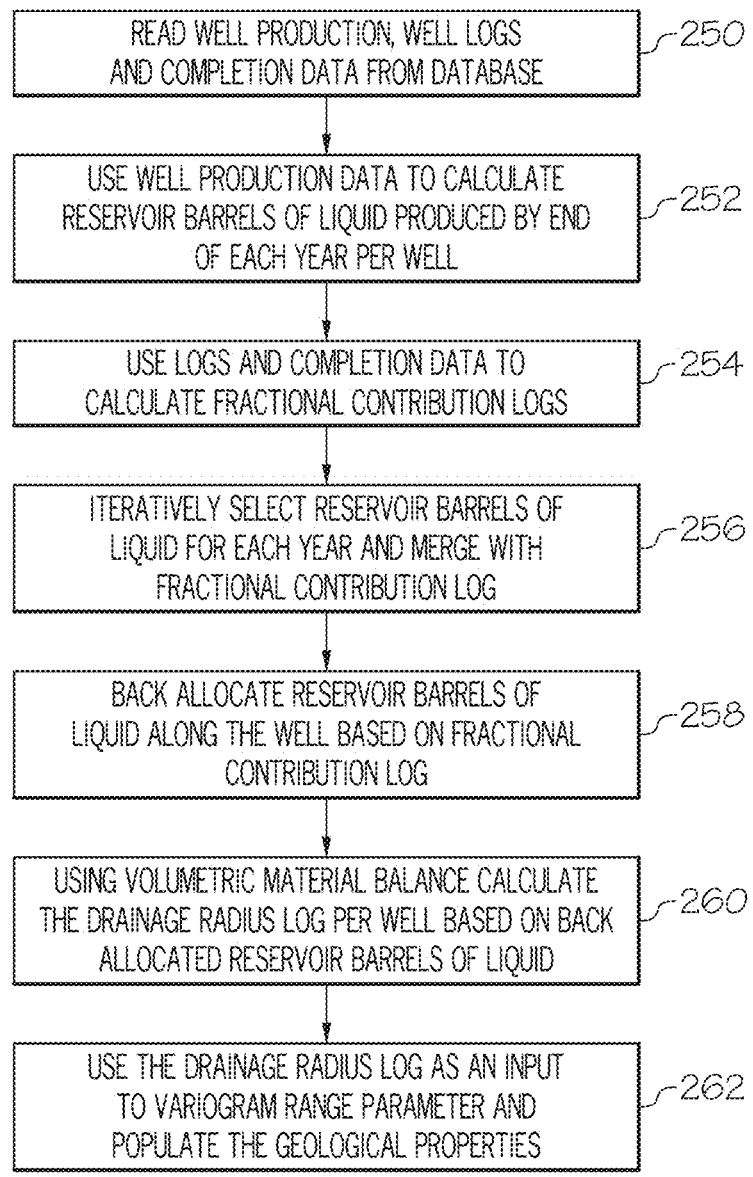
FIG. 2 depicts a flowchart for generating a drainage radius log per well in time, according to embodiments provided herein.

FIG. 2 depicts a flowchart for generating drainage radius log per well in time, according to embodiments provided herein. As illustrated in block 250, embodiments may be configured to read data from the remote computing device 104, such as a database or other data storage device. This data may include well production history for the entire well history or a portion thereof, starting from date on initial production to current date. The data may include a well name, a well number, a field, a unique well identifier (UWI), a date, an oil production rate (OPR), a water production rate (WPR), operating days (OD), etc. Well logs may be included in the data, which may include a well name, a well number, a UWI, a measured depth, a reservoir identifier, a zone, a porosity, a permeability, etc. Well completion data may also be included in the data and may include a well name, a well number, a UWI, a measured depth, a date, a top perforation, and/or a bottom perforation.

In block 252, the well production data may be used to calculate reservoir barrels of liquid produced by end of each year, per well. In block 254, the log data and completion data may be used to calculate fractional contribution logs. As described in more detail below, this may involve a per foot (or per predetermined distance) contribution of each well. In block 256, reservoir barrels of liquid from block 252 may be iteratively selected for each year and merged with the fractional contribution log from block 254. In block 258, reservoir barrels of liquid may be back allocated along the well based on the fractional contribution log. In block 260, using volumetric material balance, the drainage radius log per well may be calculated based on the back allocated reservoir barrels of liquid from block 258. In block 262, the drainage radius log may be used as input to a variogram range parameter and to populate geological properties.

Figure 3:
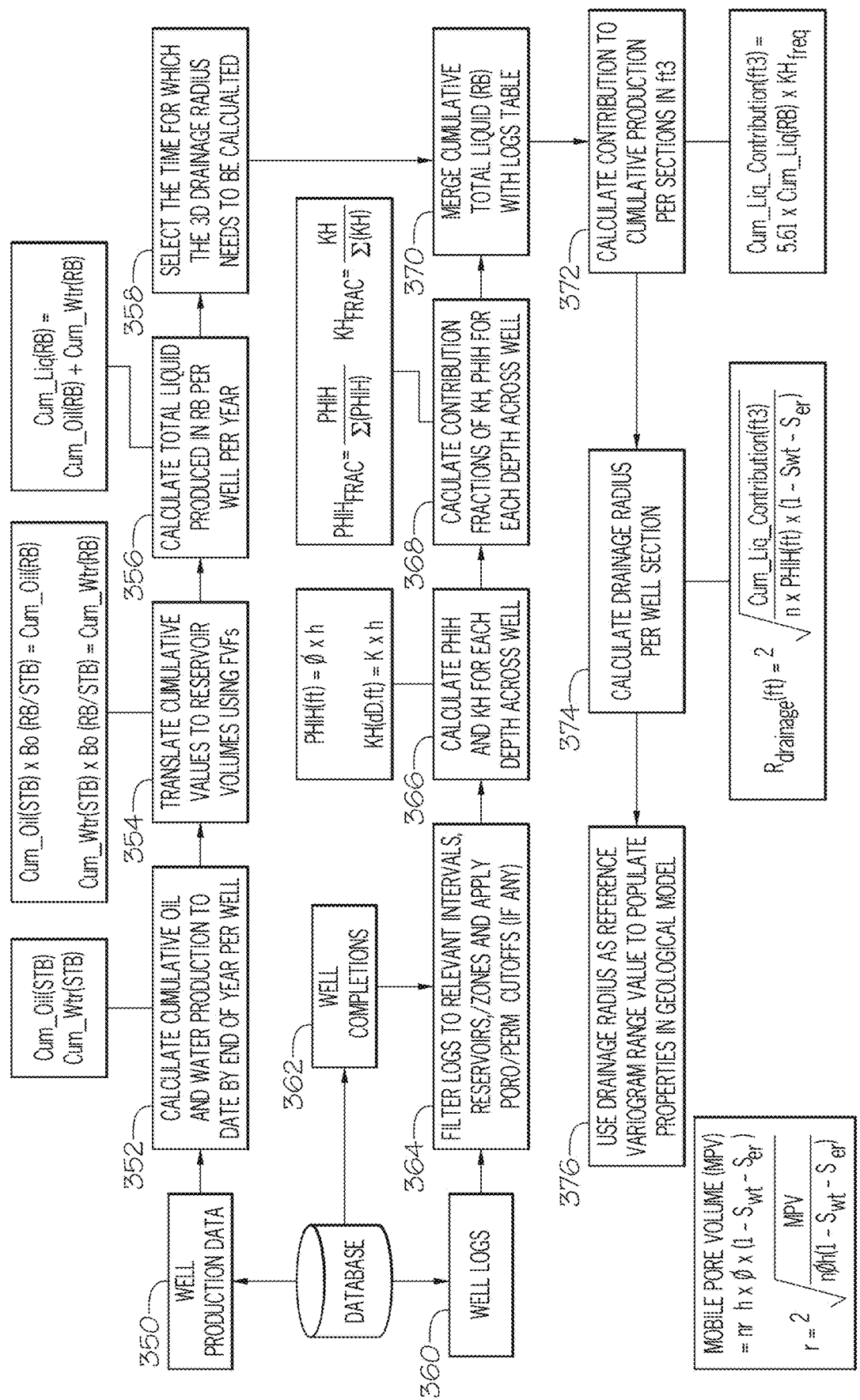
FIG. 3 depicts a flowchart further providing details regarding generating a drainage radius log per well in time, according to embodiments provided herein.

FIG. 3 depicts a flowchart further providing details regarding generating a drainage radius log per well in time, according to embodiments provided herein. As illustrated in block 350, embodiments may read production data from the remote computing device 104 or other remote data storage device. In block 352, embodiments may calculate the cumulative amount of fluid from the well, which includes the cumulative oil production (Cum_Oil) and the cumulative water production (Cum_Wtr) produced to date by end of each year. This calculation may take the form Cum_Oil (STB)=Σ(OPR×OD), for all production values in a given Year+Σ(OPR×OD) for all production values in all previous years. Similarly, Cum_Wtr(STB)=Σ(WPR×OD) for all production values in a given Year+Σ(WPR×OD) for all production values in all previous years. As referred to herein, OPR refers to oil production rate (standard barrels per day, STB/Day). WPR refers to water production rate (standard barrels per day, STB/Day). OD refers to operating days of a well (days).

At block 354, some embodiments may convert standard barrels (STB) to reservoir barrels (RB) using the formation volume factor of oil and water. Specifically, $$\text{Cum\_Oil}(STB) \times Bo\left(\frac{RB}{STB}\right) =$$

$$\text{Cum\_Oil}(RB) \text{ and } \text{Cum\_Wtr}(STB) \times Bw\left(\frac{RB}{STB}\right) = \text{Cum\_Wtr}(RB).$$

As illustrated in block 356, embodiments may calculate total reservoir liquid produced in reservoir barrels (Cum_Liq (RB)). Specifically, _Liq(RB)=Cum_Oil(RB)+Cum_Wtr (RB). In block 358, some embodiments may iteratively loop through a plurality of time periods, such as years (one at a time) from beginning until present to calculate the cumulative liquid over several years. In some embodiments, one or more particular years may be selected.

In block 360, well log data such as porosity, permeability, reservoir, zones, etc. may be read from the remote computing device 104 or other data storage device. In block 362, well completion logs may be read with well perforation interval depth information. In block 364, logs to open perforation at the given time (based on year value from loop in block 358) may be filtered to relevant intervals, reservoirs, and/or zones and porosity and/or permeability cut-off values may be specified, if applicable.

In block 366, embodiments may calculate porosity thickness (PHIH, ft) and permeability thickness (KH, ft) across the filtered data rows from block 362. This may be calculated using the following equations: PHIH(ft)=Ø×h; and KH(mD.ft)=K×h, where Ø represents porosity; K represents permeability; and h represents thickness. In block 368, for one or more wells, embodiments may calculate porosity thickness contribution fractions for each depth at first predetermined depth intervals across one well ($PHIH_{Frac}$) or more than one well and Permeability thickness contributions fractions ($KH_{Frac}$) at second predetermined depth intervals by dividing PHIH and KH at each depth by sum of PHIH and KH across entire depths across that well, using:

$$PHIH_{Frac} = \frac{PHIH}{\Sigma(PHIH)}; \text{ and } KH_{Frac} = \frac{KH}{\Sigma(KH)}.$$

In block 370, embodiments may merge the Cum_Liq(RB) value for a given year (as defined by loop in block 358) with the well log table which now also includes PHIH, KH, $PHIH_{Frac}$ and $KH_{Frac}$ columns. This merged table may include the following fields: well name and number, UWI, measured depth, reservoir, zone, porosity, permeability, PHIH, KH, $PHIH_{Frac}$, $KH_{Frac}$, and/or Cum_Liq(RB).

In block 372, embodiments may utilize the cumulative liquid (Cum_Liq(RB)) and $KH_{Frac}$ columns to back allocate the cumulative production to each of a plurality of depth segments of a well. This assumes that the total contribution to the production is proportional to the permeability thickness (KH) of that interval. The following formula calculates Cumulative Liquid Contribution in ft$^3$ per well and depth: Cum_Liq_Contribution(ft3)=5.61×Cum_Liq(RB)×$KH_{Frac}$.

In block 374, embodiments may utilize the volumetric material balance concept to calculate the drainage radius per well and depth. The following may be utilized to calculate the drainage radius log: Mobile Pore Volume(MPV)=πr$^2$h× Ø×(1–$S_{wi}$–$S_{or}$). Here, $S_{wi}$ and $S_{or}$ and immobile water and oil saturations are used. The mobile pore volume in this case is similar to Cum_Liq_Contribution(ft$^3$) calculated in block 372, thus the equation becomes:

$$Rdrainage(ft) = \sqrt[2]{\frac{Cum\_Liq\_Contribution(ft3)}{\pi \times PHIH(ft) \times (1 - Swi - Sor)}}.$$

Blocks 358 to 374 may be repeated to calculate drainage radius log per well for each consecutive year (or other increments of time). In block 376, the drainage radius log at the last year gives an understanding of the lateral extent of drainage radius away from the well at all depths. Neighboring wells where the drainage radius is overlapping may suggest connected geological bodies, and where the drainage radii are far apart, it is an indication of discontinuity or very little production. The overlapping drainage radii can be a useful piece of information since this data is used as an input to define the variogram range for populating geological properties. It should be noted that the range of variogram may be the distance within in which there is a correlation between two geo-spatial points, beyond this range value the pair of points are not spatially correlated.

Additionally, the workflow for 3D property distribution methodology using drainage radius log may include calculating connecting volumes for each well and merging with other wells on the go. The workflow may include setting a connected 3D model to zero (e.g., nothing is connected). For each well, Log 00=drainage radius. For this well only, other wells make it absent or null. The radius may additionally be upscaled to three dimensions. The three dimensional property may have same name radius. Next, embodiments may calculate a distance to these upscaling cells. Embodiments may model radius 3D property using a closest algorithm. This will assign each cell a value of the closest radius on the well. Additionally, embodiments may be configured to connect the cell if the distance is smaller than the radius, otherwise the previous results may be maintained.

Figure 4:
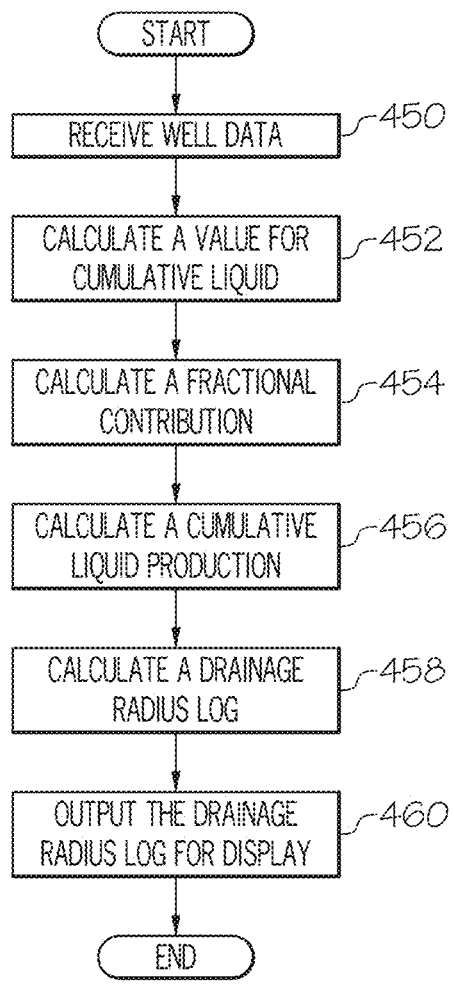
FIG. 4 depicts yet another flowchart providing details to generating a drainage radius log, according to embodiments provided herein.

FIG. 4 depicts yet another flowchart providing details to generating a drainage radius log, according to embodiments provided herein. As illustrated in block 450, well data associated with a plurality of wells may be received. In some embodiments, the well data includes well production data. In block 452, the well production data may be utilized to calculate a value for cumulative liquid produced by each of the plurality of wells for a predetermined time period. In block 454, at least a portion of the well data may be utilized to calculate a fractional contribution for each of the plurality of wells (e.g., fractional contribution of permeability thickness, fractional contribution of porosity thickness, etc.). In block 456, the value for cumulative liquid produced for each of the plurality of wells and the fractional contribution log may be utilized to calculate a cumulative liquid production for each of the plurality of wells for each of a plurality of predetermined depth segments. In block 458, the cumulative liquid production may be utilized to calculate a drainage radius log for each of the plurality of wells over time at each of the plurality of depth segments. In block 460, the drainage radius log may be output for display.

Figure 5:
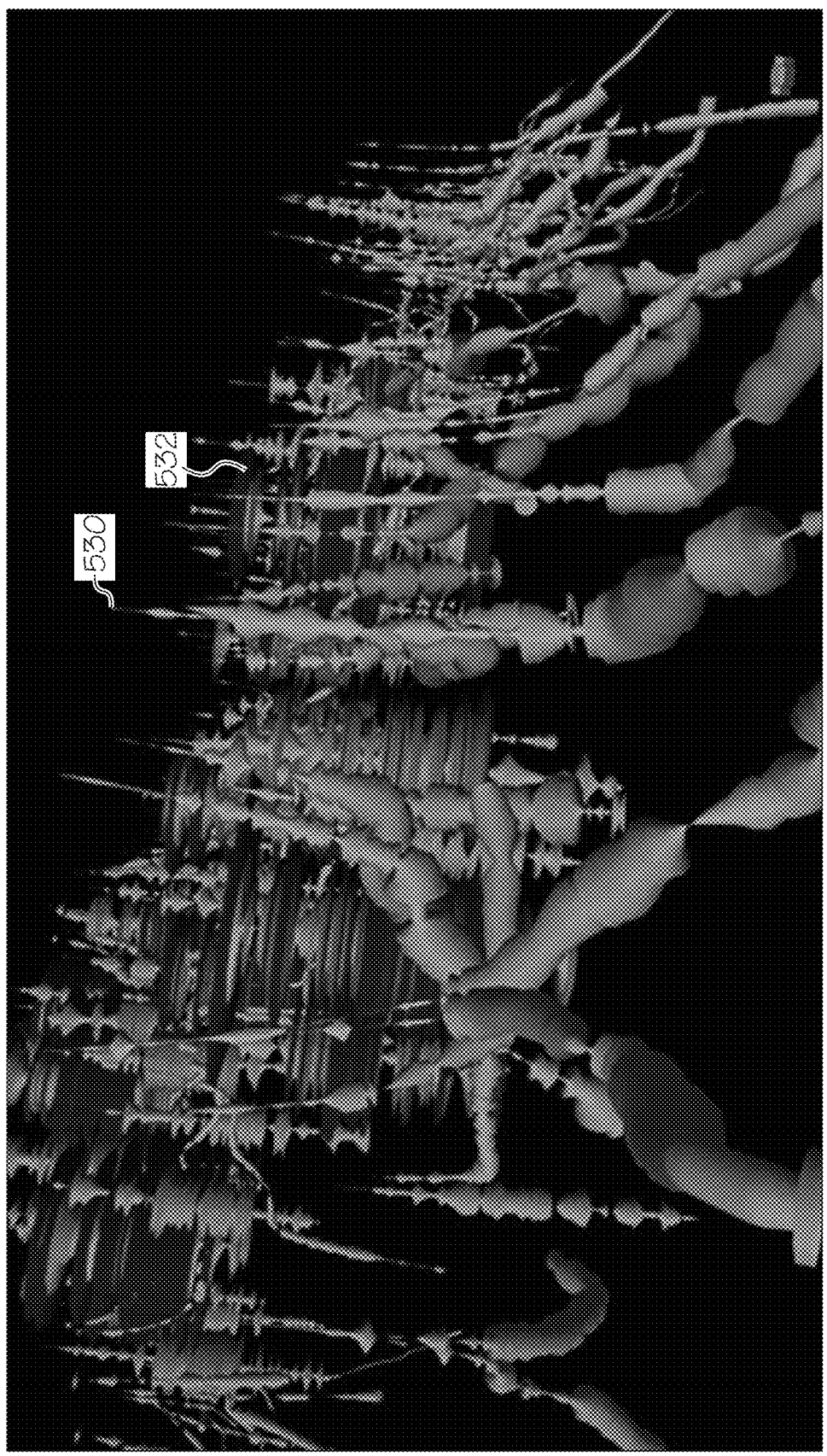
FIG. 5 depicts a graphical representation of a drainage radius log across wells, according to embodiments provided herein.

FIG. 5 depicts a graphical representation of a drainage radius log across wells, according to embodiments provided herein. As illustrated, the columns 530 are three dimensional representations of wells in a reservoir. The circular discs 532 across each depth in the well (columns 530) are the drainage, representing the radius values. This visual representation may be generated based on the calculations and values determined for the radius well log from FIGS. 2-4.

Figure 6:
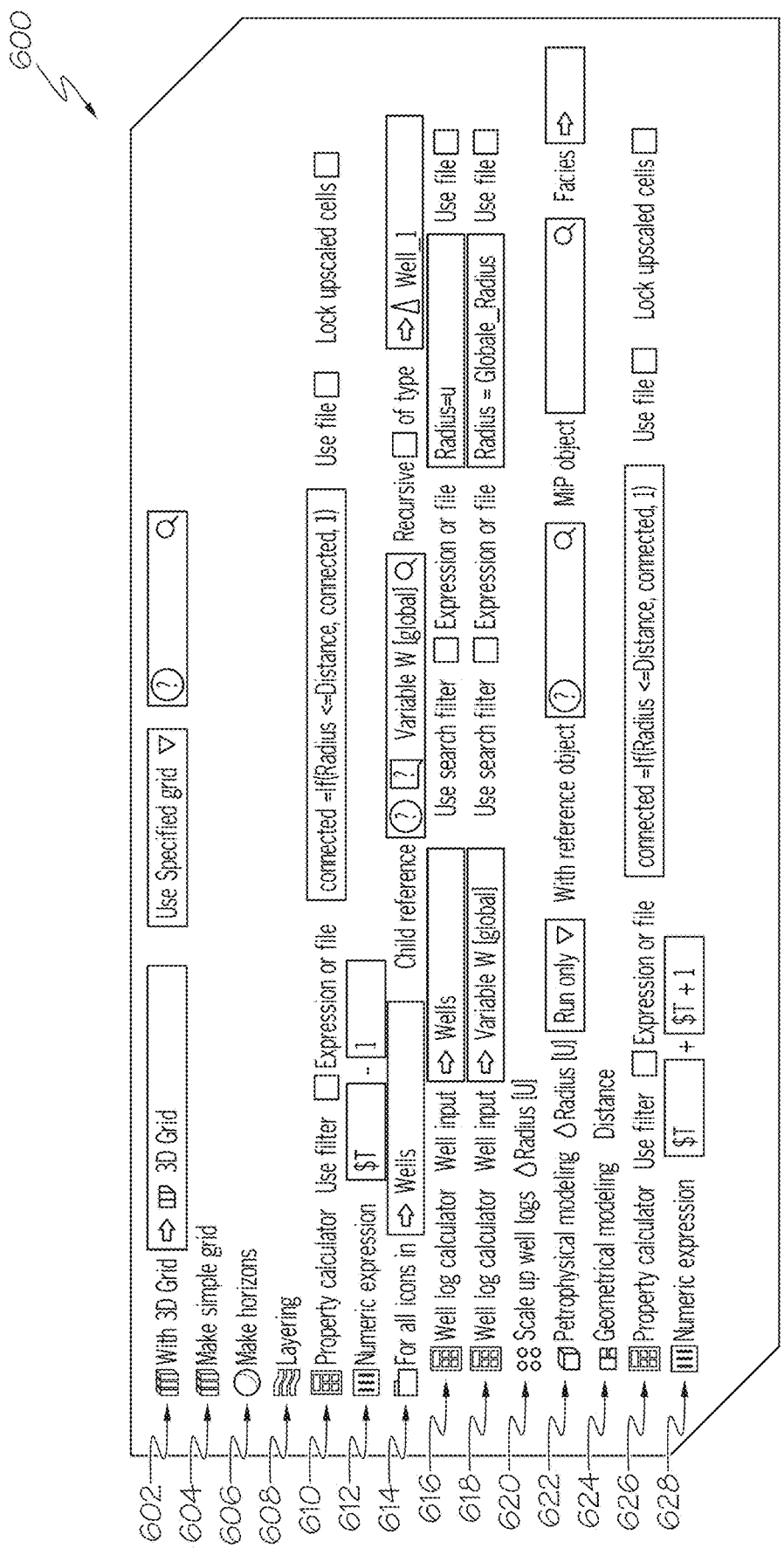
FIG. 6 depicts a user interface providing a Petrel script to generate 3D drained intervals, according to embodiments provided herein.

FIG. 6 depicts a user interface 600 providing a Petrel script to generate 3D drained intervals, according to embodiments provided herein. As illustrated, a plurality of fields may be provided for determining at least one parameter and/or generating the 3D drained intervals. The user interface 600 includes a 3D grid option 602, a simple grid option 604, a horizons option 606, a layering option 608, a property calculator option 610, and a numeric expression option 612. The 3D grid option 602 provides options for a user to create a 3D grid and select a grid type. The simple grid option 604 may be selected to instruct the user computing device 102 or remote computing device 104 to generate a simple grid without options. In response to selection of the horizons option 606 and the layering option 608, the grid that is generated depicts horizons or layers, respectively. The property calculator option 610 further provides an option to select a filter, an option to select a file, and a lock cells option. The numeric expression option 612 provides editable fields for a user to define variables in the grid.

Also provided in the user interface 600 is an icon option 614, which provides a user with the ability to define the features of icons in the grid. This option includes a section field, a child field, and a recursive field. The icon option 614 also provides additional options that will apply to the icons of the grid. As an example, well log calculator options 616, 618 provide a well input field, a search filter option, an expression field, and a file option. The icon option 614 also provides a scale up option 620, a petrophysical modeling option 622, a geometrical modeling option 624, a property calculator option 626, and a numeric expression option 628. The scale up option 620 provides a radius option. The petrophysical modeling option 622 provides a radius option, a reference object option, a MIP object option, and a facies option. The geometrical modeling option 624 provides a distance option. The property calculator option 626 provides an option to select a filter, an option to select a file, and a lock cells option. The numeric expression option 628 provides editable fields for a user to define variables in the grid.

FIGS. 7A-7C depict user interfaces providing drained intervals at a first well, according to embodiments provided herein. As illustrated in FIG. 7A, the user interface 702 provides radius of a well. Specifically, well 2 is being analyzed in FIG. 7A, which depicts a relative radius at various depths. FIG. 7B, provides a user interface 704, which provides a graphical depiction of distance between a well. Specifically, as well 2 is the focus, well 1 is depicted as being approximately 1200 meters from well 2. In FIG. 7C, connection status is provided in user interface 706. Specifically, well 2 is depicted with connection points, as calculated from the well radius logs on a per-foot basis. As depicted, well 1 is not connected with well 2.

FIGS. 8A-8C depict user interfaces providing drained intervals at final step (second well), according to embodiments provided herein. As illustrated, FIGS. 8A-8C are similar to FIGS. 7A-7C, with well 1 being focused. In the user interface 802 of FIG. 8A, well 2 radius is provided at various depths. In FIG. 8B, the user interface 804 provides a distance from well 2 to well 1. In FIG. 8C, user interface 804 provides the connection status between well 2 and well 1. As illustrated, the well radius logs depicted in the user interface 804 are such that well 2 is connected with well 1 at a plurality of depths.

Figure 9A:
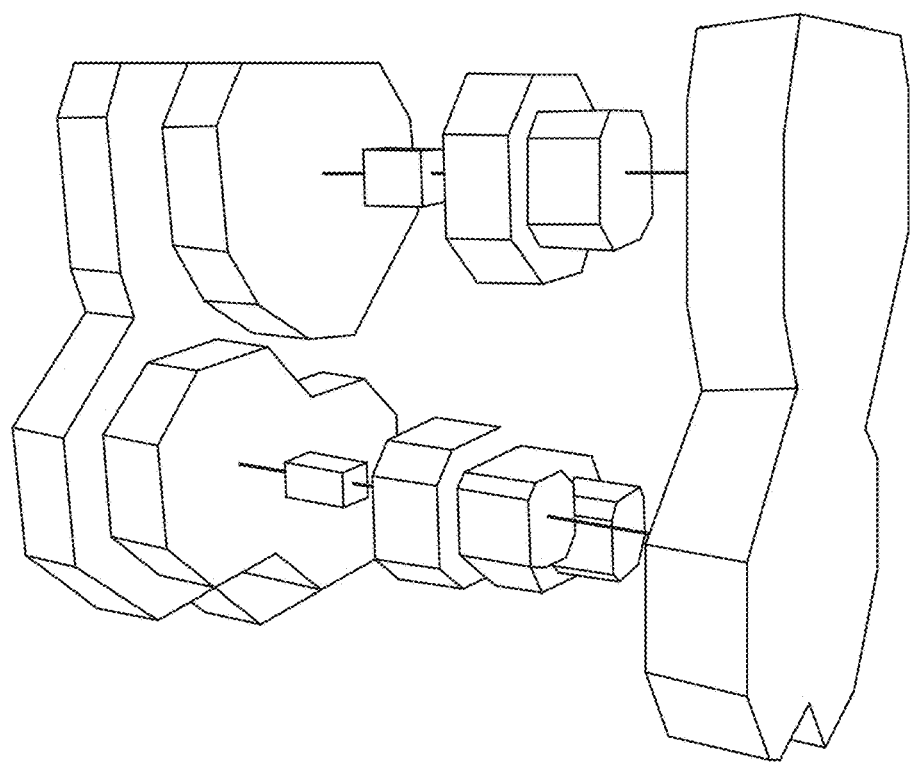
FIGS. 9A, 9B depict 3D drainage area views, according to embodiments provided herein.
Figure 9B:
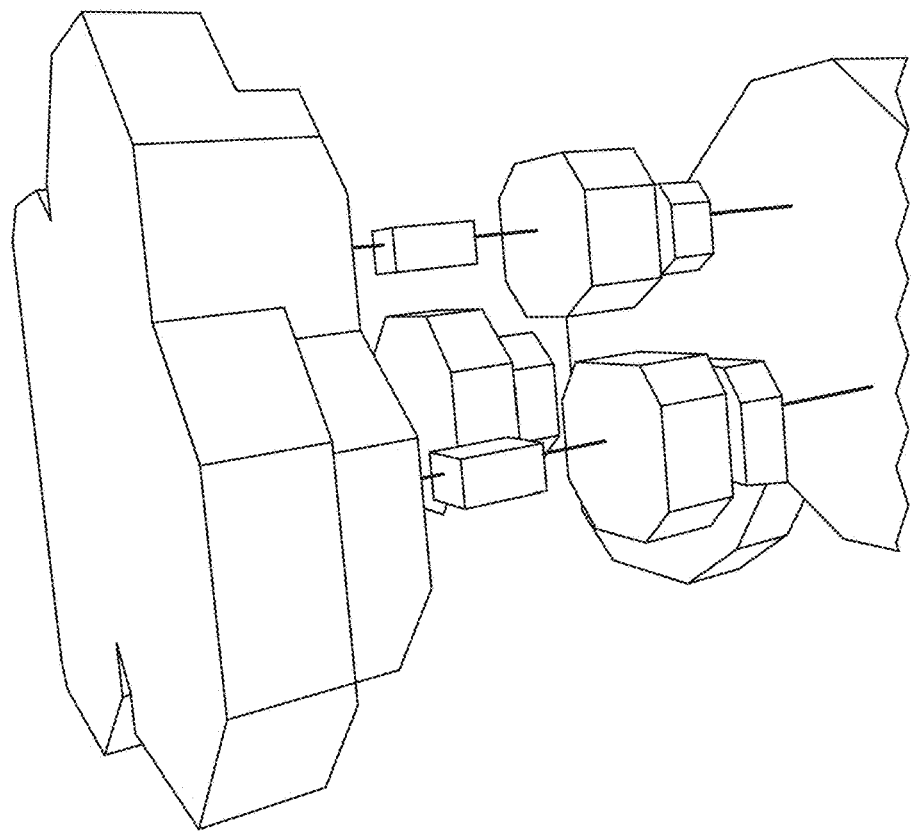

FIGS. 9A, 9B depict 3D drainage area views, according to embodiments provided herein. As illustrated, these views provide different 3D perspectives of a well. While FIGS. 7A-7C provide a two dimensional representation of the radius log data, FIGS. 9A and 9B provide similar information for the depicted wells in three dimensions, thereby showing connection points and other information associated with this data.

Figure 10:
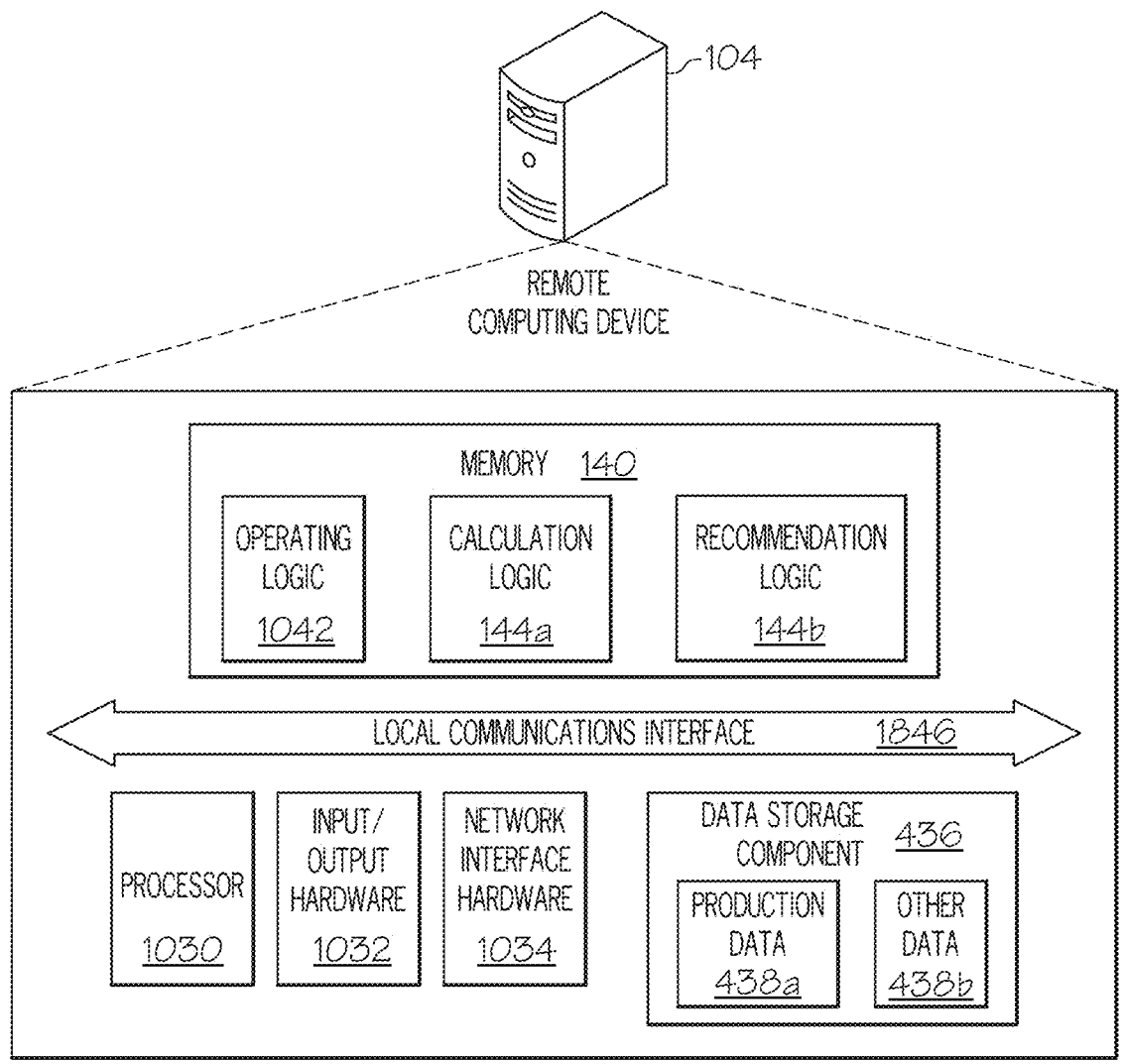
FIG. 10 depicts a remote computing device for generating a drainage radius log, according to embodiments provided herein.

FIG. 10 depicts a remote computing device 104 for generating a drainage radius log, according to embodiments provided herein. As illustrated, the remote computing device 104 includes a processor 1030, input/output hardware 1032, a network interface hardware 1034, a data storage component 1036 (which stores production data 1038a and/or other data 1038b as described with reference to FIG. 2), and a memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within the remote computing device 104 and/or external to the remote computing device 104.

The memory component 140 may store operating logic 1042, the calculation logic 144a, and the recommendation logic 144b. Each of these logic components may include a plurality of different pieces of logic, each of which may be embodied as a computer program, firmware, and/or hardware, as an example. A local interface 1046 is also included in FIG. 10 and may be implemented as a bus or other communication interface to facilitate communication among the components of the remote computing device 104.

The processor 1030 may include any processing component operable to receive and execute instructions (such as from a data storage component 1036 and/or the memory component 140). As described above, the input/output hardware 1032 may include and/or be configured to interface with speakers, microphones, and/or other input/output components.

The network interface hardware 1034 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the remote computing device 104 and other computing devices.

The operating logic 1042 may include an operating system and/or other software for managing components of the remote computing device 104. As discussed above, the calculation logic 144a may reside in the memory component 140 and may be configured to cause the processor 1030 to perform the calculations and depict the interfaces and plots described herein. The recommendation logic 144b may be configured to cause the processor 1030 to provide the recommendations of type of water management strategy and/or provide locations and other details regarding that recommendation.

It should be understood that while the components in FIG. 10 are illustrated as residing within the remote computing device 104, this is merely an example. In some embodiments, one or more of the components may reside external to the remote computing device 104 or within other devices, such as the user computing device 102 depicted in FIG. 1. It should also be understood that, while the remote computing device 104 is illustrated as a single device, this is also merely an example. In some embodiments, the calculation logic 144a and the recommendation logic 144b may reside on different computing devices.

As an example, one or more of the functionalities and/or components described herein may be provided by the remote computing device 104 and/or the user computing device 102. Depending on the particular embodiment, any of these devices may have similar components as those depicted in FIG. 10. To this end, any of these devices may include logic for performing the functionality described herein.

Additionally, while the remote computing device 104 is illustrated with the calculation logic 144a and the recommendation logic 144b as separate logical components, this is also an example. In some embodiments, a single piece of logic may provide the described functionality. It should also be understood that while the calculation logic 144a and the recommendation logic 144b are described herein as the logical components, this is also an example. Other components may also be included, depending on the embodiment.

As illustrated above, various embodiments for generating a radius log are disclosed. These embodiments may be configured to calculate the radius log per well at any point in time and then use these logs as an input to populate properties such as porosity and permeability in a three dimensional representation or three dimensional model.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for generating a drainage log. It should also be understood that these embodiments are merely exemplary and are not intended to limit the scope of this disclosure.

What is claimed is:

1. A system for generating a drainage radius log per well comprising:
   a computing device with a memory component that stores logic, that when executed by the computing device, causes the system to perform at least the following:
   receive well data associated with a plurality of wells, the well data including well production data;
   utilize the well production data to calculate a value for cumulative liquid produced by each of the plurality of wells for a predetermined time period;
   utilize a permeability value to calculate permeability thickness and a fractional permeability thickness for the plurality of depth segments for the plurality of wells;
   utilize the value for cumulative liquid produced for each of the plurality of wells and the fractional permeability thickness to calculate a cumulative liquid production for each of the plurality of wells at a plurality of depth segments;
   utilize the cumulative liquid production for each of the plurality of wells at the plurality of depth segments to calculate the drainage radius log for each of the plurality of wells; and
   generate a three dimensional model of the drainage radius log for display.

2. The system of claim 1, wherein the value for liquid produced by each of the plurality of wells includes a cumulative oil production and a cumulative water production for each of the plurality of wells.

3. The system of claim 1, wherein the logic causes the system to utilize a porosity value to calculate porosity thickness and a fractional porosity thickness for a plurality of depth segments across each of the plurality of wells.

4. The system of claim 3, wherein the porosity thickness is calculated for each depth at a first predetermined depth intervals across one well of the plurality of wells, and wherein the permeability thickness is calculated for each depth at predetermined second depth intervals across the one well of the plurality of wells.

5. The system of claim 1, wherein the well data includes a well log, wherein the logic further causes the system to filter the well log into at least one of the following: intervals, reservoirs, or zones.

6. The system of claim 5, wherein the logic further causes the system to apply porosity and permeability cutoffs to the well log.

7. The system of claim 1, further comprising generating a variogram of the drainage radius log.

8. The system of claim 1, wherein the logic further causes the system to perform at least the following:
   compare a distance between a first well and a second well of the plurality of wells and a drainage radius from the drainage radius log for each of the first well and the second well to determine where the first well and the second well are connected; and
   provide information related to a position that the first well and the second well are connected.

9. The system of claim 8, wherein the information related to the position that the first well and the second well are connected includes at least one of the following: a two dimensional representation of the position and the drainage radius log of the first well and the second well or a three dimensional representation of the position and the drainage radius log of the first well and the second well.

10. The system of claim 1, wherein the logic further causes the system to provide a user interface for defining at least one parameter of the drainage radius log.

11. The system of claim 1, wherein the well data further includes at least one of the following: a well name, a well number, a field, a unique well identifier (UWI), a date, an oil production rate (OPR), a water production rate (WPR), operating days (OD), a well log, a measured depth, a reservoir identifier, a zone, a porosity, a permeability, well completion data, a top perforation, or a bottom perforation.

12. The system of claim 1, wherein the logic further causes the system to back allocate reservoir barrels of liquid along the plurality of wells, based on the fractional contribution for each of the plurality of wells.

13. The system of claim 1, wherein the logic further causes the system to iteratively loop through a plurality of time periods from beginning until present to calculate the cumulative liquid produced.

14. The system of claim 1, wherein the logic further causes the system to merge the value for cumulative liquid with the fractional contribution to create a merged table.

15. The system of claim 14, wherein the merged table includes a least one of the following: a well name a well number, a UWI, a measured depth, a reservoir, a zone, a porosity, a permeability, a porosity thickness, a permeability thickness, a fractional contribution of porosity thickness, a fractional contribution of permeability thickness, or the cumulative liquid produced.

16. A method for generating drainage radius log per well in time comprising:
   receiving, by a computing device, well data associated with a plurality of wells, the well data including well production data;
   utilizing, by the computing device, the well production data to calculate a value for cumulative liquid produced by each of the plurality of wells for a predetermined time period;
   utilizing, by the computing device, a permeability value to calculate permeability thickness and a fractional permeability thickness for the plurality of depth segments for the plurality of wells;

utilizing, by the computing device, the value for cumulative liquid produced for each of the plurality of wells and the fractional permeability thickness to calculate a cumulative liquid production for each of the plurality of wells for each of a plurality of predetermined depth segments;

utilizing, by the computing device, the cumulative liquid production to calculate a drainage radius log for each of the plurality of wells over time at each of the plurality of predetermined depth segments; and rendering, by the computing device, a three dimensional model of the drainage radius log for display.

17. The method of claim 16, further comprising utilizing a porosity value to calculate porosity thickness and a fractional porosity thickness for a plurality of depth segments across each of the plurality of wells.

18. The method of claim 16, further comprising:

comparing, by the computing device, a distance between a first well and a second well of the plurality of wells and a drainage radius from the drainage radius log for each of the first well and the second well to determine where the first well and the second well are connected; and providing, by the computing device, information related to a position that the first well and the second well are connected.

19. A non-transitory computer-readable medium that includes logic that, when executed by a computing device, causes the computing device to perform at least the following:

receive well data associated with a plurality of wells;

utilize the well data to calculate a value for cumulative liquid produced by each of the plurality of wells for a predetermined time period;

utilize at least a portion of the well data to calculate a fractional contribution for each of the plurality of wells;

utilize a permeability value to calculate permeability thickness and a fractional permeability thickness for the plurality of depth segments for the plurality of wells;

utilize the value for cumulative liquid produced for each of the plurality of wells and the fractional permeability thickness to calculate a cumulative liquid production for each of the plurality of wells for each of a plurality of predetermined depth segments;

utilize the cumulative liquid production to calculate a drainage radius log for each of the plurality of wells over time at each of the plurality of predetermined depth segments; and generate a three dimensional model of the drainage radius log for display.

20. The non-transitory computer-readable medium of claim 19, wherein the logic further causes the computing device to perform at least the following:

compare a distance between a first well and a second well of the plurality of wells and a drainage radius from the drainage radius log for each of the first well and the second well to determine where the first well and the second well are connected; and provide information related to a position that the first well and the second well are connected.

* * * * *